United States Patent [19]

Frick et al.

[11] Patent Number: 4,973,801
[45] Date of Patent: Nov. 27, 1990

[54] INTERLOCKED MOTION DETECTOR WALL SWITCH

[75] Inventors: William C. Frick; Paul W. Rothweiler, Jr., both of Lancaster, Pa.

[73] Assignee: Burle Technologies, Inc., Wilmington, Del.

[21] Appl. No.: 462,790

[22] Filed: Jan. 10, 1990

[51] Int. Cl.⁵ .......................... H01H 9/22; H01H 9/28
[52] U.S. Cl. .................................. 200/43.19; 250/221; 200/333; 200/327; 200/50 A
[58] Field of Search ............... 200/43.15, 43.16, 43.17, 200/43.21, 43.22, 329, 333, 43.19, 43.11, 43.12, 61.02, 61.93, 321, 322, 327, 50 A; 174/66; 250/221

[56] References Cited

U.S. PATENT DOCUMENTS

| | | | |
|---|---|---|---|
| D. 253,879 | 1/1980 | Jensen | D10/106 |
| 2,807,692 | 9/1957 | Leslie | 200/43.21 |
| 2,824,915 | 2/1958 | Buturuga | 200/43.16 |
| 2,832,857 | 4/1958 | Landmeier | 200/43.14 |
| 3,839,614 | 10/1974 | Saganowski | 200/43.17 |
| 4,102,471 | 7/1978 | Lore | 200/43.16 |
| 4,468,544 | 8/1984 | Wainess | 200/43.16 |
| 4,554,421 | 11/1985 | Grunert | 200/43.15 |
| 4,719,363 | 1/1988 | Gallacher | 250/221 |
| 4,873,469 | 10/1989 | Young et al. | 250/221 |

Primary Examiner—Henry J. Recla
Assistant Examiner—Robert C. Lawson
Attorney, Agent, or Firm—Martin Fruitman

[57] ABSTRACT

An interlocked infrared detector wall switch which prevents use of the full "on" position that bypasses the infrared sensor, but permits changeover by service personnel to use the full "on" position. The slide switch on the wall switch assembly is partially covered by a snap-on interlock plate so that it can not be moved to the full "on" position. Removal of the interlock plate requires a screwdriver for leverage within an opening at the bottom of the interlock plate, but this opening is covered by the decorative switch plate, so that removal of the interlock plate is impossible without first removing the covering decorative plate. Casual disabling of the interlock is thereby prevented.

5 Claims, 2 Drawing Sheets

INTERLOCKED MOTION DETECTOR WALL SWITCH

SUMMARY OF THE INVENTION

This invention deals generally with electrical switches, and more specifically with an infrared motion detector wall switch in which the switch position which bypasses the motion detection control action is blocked from casual operation.

Infrared motion detector light control switches are becoming more and more common. They are used not only for security purposes but also to control many areas of commercial buildings to save energy by using lights only when an area is actually occupied.

When such switches are used in private dwellings it is usually desirable to permit the user to bypass the infrared control function, so that the lights can be turned on manually, even if no motion has been detected. For instance, when such a system is installed on the front of a dwelling, it may be desirable to occasionally turn on the lights to identify the location or to illuminate the house number.

On the other hand, when such systems are used in commercial locations for the specific purpose of saving energy, permitting the infrared motion detector function to be bypassed defeats the entire purpose of the device. It is almost a foregone conclusion that if someone can turn the lights on manually, the lights will be left on when the area is not occupied, and therefore energy will be wasted.

Nevertheless, it adds considerable cost to the production and distribution of a product if two separate devices must be manufactured when their actual uses are so closely related.

The present invention solves this problem of different applications for the same product by designing the infrared motion detector wall switch so that it can be modified in the field to operate properly for either particular use, but nevertheless, the construction prevents the casual user from changing the switch from one mode of operation to the other. This is accomplished by the use of an interlocking cover plate which interferes with the motion of the controlling slide switch and prevents the slide switch from being placed in the full "on" position.

In the preferred embodiment of the invention, a simple slide switch is used to provide three control positions. The two positions which are always available are full "off" and "automatic". In the "off" position no power can be applied to the lights which the switch controls, regardless of the motion within the area which is monitored by the motion detector. In the "automatic" switch position the lights are controlled by the motion detector and are turned on when motion is detected. Typically, the lights remain on for a preset time period after all motion has stopped, and then they are turned off automatically. The third position of the slide switch is the one which is affected by the interlocking plate of the present invention. It is the full "on" position of the switch, and it manually turns the lights on for as long as it remains in the "on" position. In the preferred embodiment of the invention, the slide switch is located within a small, approximately rectangular, recess on the front surface of the structure of the infrared motion detector assembly. The interlocking plate is shaped to match the outline of the recess and snaps into the recess. The interlocking cover plate is held within the recess by conventional detents, for instance, small barbs on the surface of one part, the interlocking plate, which fit into small holes in the matching part, the sidewalls of the recess.

Once the interlocking plate is snapped into the recess, the "on" position of the slide switch is covered, and the slide switch is restricted in its movement to only the "off" and "automatic" positions. What is more, the interlocking plate can not easily be removed because the detents retain it in the recess, and it fits so closely to the sides of the recess that no tool can be inserted between it and the recess walls to pry it out. However, the recess itself is constructed with a release opening, a gap in one of its sidewalls, and it is by using this release opening that the interlocking plate can be removed. When a screwdriver or other leverage tool is inserted through the gap of the recess sidewall, the tool can be inserted between the interlocking plate and the bottom of the recess, and the interlocking plate can then be released by a mere twist of the tool.

However, when a standard decorative cover plate is installed on the infrared motion detector assembly, as it always is in any finished installation, the decorative plate fits tightly around the recess sidewall, thus covering access to the release opening. It is then virtually impossible to remove the interlock plate, so that not only is the full "on" position of the switch blocked, but changing over to the mode of operation which gives full use of the switch requires a tool and an understanding of the method of changeover.

The present invention therefore accomplishes the goal of permitting one product to serve both the typical residential installation which desires full control, and, with little additional cost or complexity, to also serve the commercial installations which require that no full "on" position of the switch be available unless permitted by service personnel.

DETAILED DESCRIPTION OF THE INVENTION

Figure 1:
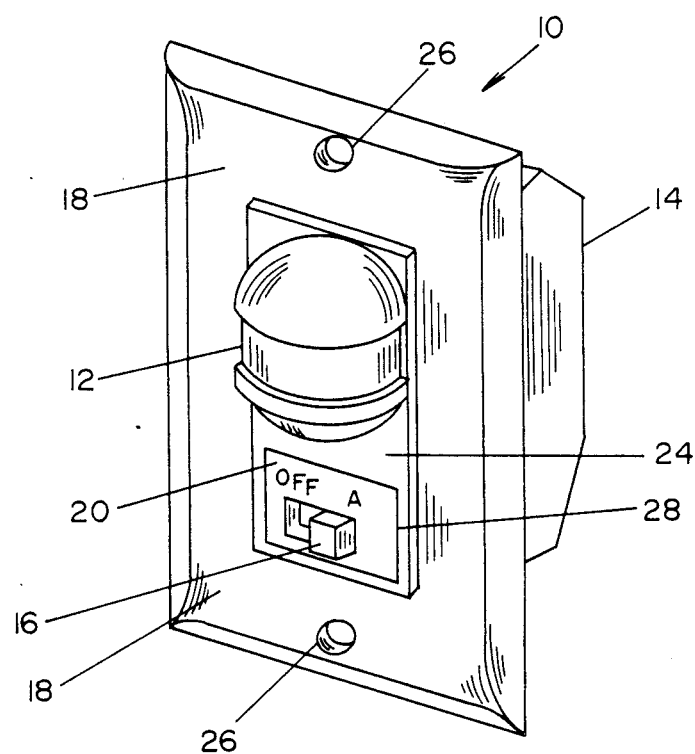
FIG. 1 is a perspective view of the fully assembled motion detector wall switch of the preferred embodiment.

The preferred embodiment of the invention is shown fully assembled in FIG. 1 in which motion detector wall switch 10 includes infrared detector 12, body 14, manual control switch 16, decorative cover plate 18, and interlock plate 20.

An important aspect of the construction of motion detector wall switch 10 is that interlock plate 20 fits tightly into recess 28 which is located in front face 24 of body 14. Decorative cover plate 18 is then located so that it surrounds front face 24 of body 14.

FIG. 1 shows motion detector wall switch 10 as it is set up for its energy conservation mode. In that mode, interlock plate 20 permits only limited motion of manual switch 20, so that manual switch 20 may only be set in two of its three positions. As seen in FIG. 1, the two positions for manual switch 16 are "OFF", which prevents all power from reaching the lights (not shown) that motion detector wall switch 10 controls, and "A"

which puts the lights under automatic control of the motion detector circuit within wall switch 10.

Since interlock plate 20 blocks and covers the third position of manual switch 16, the casual user will not even be aware that there is another position for manual switch 16. However, even if the user does understand the full capability of manual switch 16, since interlock plate 20 is securely inserted into front face 24, interlock plate 20 can not be removed without a tool and without knowledge of the specific procedure required.

Figure 2:
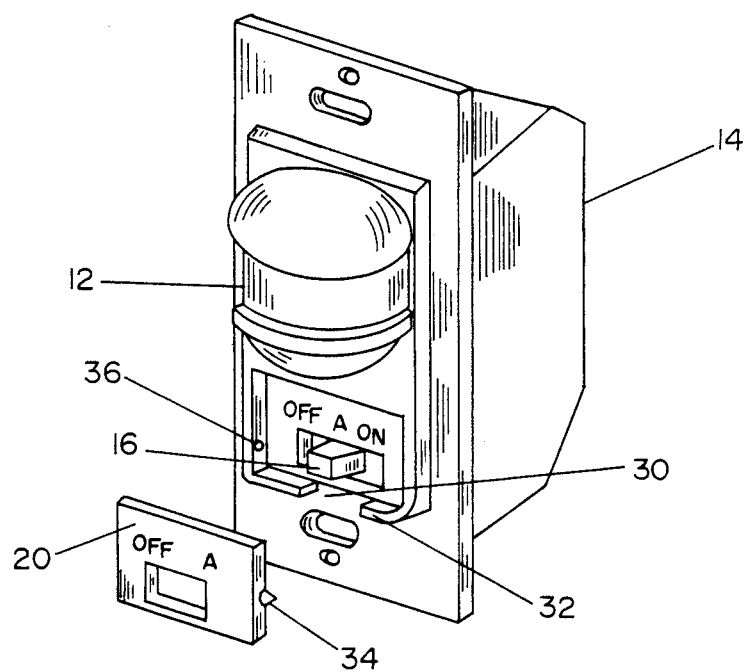
FIG. 2 is a view of part of the motion detector wall switch of the preferred embodiment, showing the interlock plate recess with the interlock plate removed.

The capture and release functions of interlock plate 20 can best be understood by reference to FIG. 2, which is a view of motion detector wall switch 10 with decorative cover plate 18 absent, and with interlock plate 20 removed but still visible. Of course, decorative cover plate 18 can be removed in the same manner as any other conventional switch cover plate, by removing the two screws which normally penetrate holes 26 near its top and bottom edges (as seen in FIG. 1).

FIG. 2 shows the full capability of manual switch 16 because its third position is visible and no longer interlocked. The full "ON" position of manual switch 16 is activated when the switch is moved fully to the right, and this position manually turns on the lights, or any other load, that motion detector wall switch 10 is connected to control. The other two positions of manual switch 16 also remain accessible, so that the manual "OFF" and the automatic motion control positions may also still be used.

In FIG. 2, recess 28, into which interlock plate 20 fits, is also visible, along with gap 30 in one sidewall of recess 28. Recess 28 is located in front face 24 of wall switch 10, and recess 28 is dimensioned so that interlock plate 20 fits into recess 28, and, when assembled together, the front surface of interlock plate 20 does not protrude above the edges of recess 28.

It is gap 30, an opening in side wall 32 of recess 28, which permits the removal of interlock plate 20 from recess 28 once the decorative cover plate has been removed. It should be apparent that if all the sidewalls of recess 28 were continuous, it would be no easier to remove interlock plate 20 with the decorative cover plate removed than with the decorative cover plate in place. However, with decorative cover plate 18 gone, gap 30 in sidewall 32 provides access to the discontinuity, the crack, between the underside of interlock plate 20 and the bottom surface of recess 28.

When a screwdriver or other leverage tool is inserted into the space between interlock plate 20 and the bottom of recess 28, and the tool is twisted, that is all that is needed to lift the interlock plate out of recess 28 and remove it. Because of the need to place the tool between the underside of the interlock plate and the bottom surface of recess 28, one requirement of the opening in the sidewall of recess 28 is that opening 30 be at least as deep as the thickness of interlock plate 20.

Another aspect of the construction of interlock plate 20 is the means to assure that it is retained within recess 28 despite vibration or tampering. This is accomplished by the use of conventional detents. In the preferred embodiment, these detents are simple barbs 34 on two edges of interlock plate 20, which fit into small holes 36 in the matching sidewalls of recess 28. Only one of each of the parts of the detents are visible in FIG. 2. These detents could, of course be of different construction or in different locations, and might not even be required under some circumstances, for instance, if the decorative cover plate were constructed so that the edge of the opening within it partially covered interlock plate 20.

Regardless of the specific details of its construction, the present invention furnishes a motion detector wall switch which may be used for two diverse applications, and assures that when it is being used in the more stringent of the two applications, the one that requires energy conservation, it can not be modified by unauthorized users.

It is to be understood that the form of this invention as shown is merely a preferred embodiment. Various changes may be made in the function an arrangement of parts; equivalent means may be substituted for those illustrated and described; and certain features may be used independently from others without departing from the spirit and scope of the invention as defined in the following claims.

For example, gap 30 could be located elsewhere, be larger or smaller, or even involve the absence of whole sidewalls of recess 28, as long as the shape of the opening in decorative cover plate 18 prevents access to the underside of the edges of interlock plate 20. Furthermore, the present invention could also be used with motion detectors using detection systems other than infrared.

What is claimed as new and for which Letters patent of the United States are desired to be secured is:

1. In a motion detector wall switch of the type which includes a motion detector circuit, a removable decorative cover plate and a manual control switch, with the manual control switch having a position which permits a user to place the manual control switch in a condition which furnishes power to a load and bypasses the motion detector circuit, the improvement comprising:

an interlock plate removably attached to the the motion detector wall switch and blocking the movement of the manual control switch, so that, when the interlock plate is installed on the motion detector wall switch, the manual control switch can not be placed in a condition to furnish power to the load and bypass the motion detector circuit;

interlock plate removing means by which the interlock plate can be detached from the motion detector wall switch; and a removable decorative cover plate which prevents access to the interlock plate removing means when the decorative cover plate is installed upon the motion detector wall switch.

2. In a motion detector wall switch of the type which includes a motion detector circuit, a removable decorative cover plate and a manual control switch on the front surface of the motion detector wall switch, with the manual control switch having a position which permits a user to place the manual control switch in a condition which furnishes power to a load and bypasses the motion detector circuit, the improvement comprising:

an interlock plate removably attached to the the motion detector wall switch and blocking the movement of the manual control switch, so that, when the interlock plate is installed on the motion detector wall switch, the manual control switch can not be placed in a condition to furnish power to the load and bypass the motion detector circuit, with the interlock plate being attached by being inserted into a recess with sidewalls located on the front surface of the motion detector wall switch;

interlock plate removing means by which the interlock plate can be detached from the motion detector wall switch; and a removable decorative cover plate which prevents access to the interlock plate removing means when the decorative cover plate is installed upon the motion detector wall switch.

3. The motion detector wall switch of claim 2 wherein the interlock plate removing means is a sidewall of the recess into which the interlock plate is inserted, with the sidewall having an opening through which a tool can be inserted under the interlock plate in order to apply a force to remove the interlock plate from the recess.

4. The motion detector wall switch of claim 2 wherein the manual control switch is a slide switch.

5. The motion detector wall switch of claim 2 further including detents attached to the interlock plate and the sidewalls of the recess to hold the interlock plate in location.

* * * * *